United States Patent [19]
Park

[11] Patent Number: 6,092,151
[45] Date of Patent: Jul. 18, 2000

[54] CRT UPDATE APPARATUS AND METHOD FOR VARIABLE SIZE CACHE MEMORY USING TAGS AND ADDRESS BOUNDARY DETERMINATION

[75] Inventor: Heon-Chul Park, Cupertino, Calif.

[73] Assignee: Samsung Electronics Co., Ltd., Rep. of Korea

[21] Appl. No.: 08/760,668

[22] Filed: Dec. 9, 1996

[30]  Foreign Application Priority Data

Jan. 12, 1996 [KR] Rep. of Korea ............................ 96-560

[51] Int. Cl.[7] ..................................................... G06F 12/00
[52] U.S. Cl. ........................... 711/118; 711/138; 711/128; 711/119
[58] Field of Search ................................... 711/119, 128, 711/138, 118; 345/501

[56]  References Cited

U.S. PATENT DOCUMENTS

| 4,357,656 | 11/1982 | Saltz et al. | 711/138 |
| 5,367,653 | 11/1994 | Coyle et al. | 711/128 |
| 5,371,872 | 12/1994 | Larsen et al. | 395/425 |
| 5,465,342 | 11/1995 | Walsh | 711/119 |
| 5,602,984 | 2/1997 | Mieras | 345/501 |

*Primary Examiner*—Tod R. Swann
*Assistant Examiner*—David Caugjahr
*Attorney, Agent, or Firm*—Myers Bigel Sibley & Sajovec

[57]  ABSTRACT

A portion of cache memory may be converted from temporary memory to fixed memory such that the instructions, data or both instructions and data stored at the cache memory address are fixed or locked at the cache memory address and cannot be overwritten. As a result, the portion of the cache memory corresponding to the cache memory address becomes a physical static random access memory (SRAM). The cache memory has cache memory addresses with data elements temporarily stored therein and a tag associated with each cache memory address. A use mode selector designates whether the portion of cache memory located at the cache memory address is to be converted from temporary memory to fixed memory. A use mode cache controller, using an input address from a memory address register, a tag from a tag RAM portion of cache memory, and an upper limit address and lower limit address identifying the boundaries of the data in cache memory, determines whether the input address correctly corresponds to data stored in the data cache RAM portion of cache memory (i.e., whether the data corresponding to the input address is presently stored in cache memory). Thereafter, the use mode cache controller, based on the output of the use mode selector, converts the portion of the cache memory corresponding to the input address from temporary memory to fixed memory so that the data stored in such portion is fixed and cannot be overwritten. As a result, processor performance can be improved in that the demanded data resides permanently in cache memory thereby allowing decrease in access time without requiring increases in the size of cache memory.

14 Claims, 1 Drawing Sheet

CRT UPDATE APPARATUS AND METHOD FOR VARIABLE SIZE CACHE MEMORY USING TAGS AND ADDRESS BOUNDARY DETERMINATION

FIELD OF THE INVENTION

This invention relates to cache memories, and more particularly, to cache memory systems which improve performance in computing systems.

BACKGROUND OF THE INVENTION

Cache memory has long been used in computing systems to decrease the memory access time for the central processing unit (CPU) thereof. Cache memory may be used to store only program instructions, only data, or both program instructions and data. A cache memory is typically a relatively high speed, relatively small memory in which active portions of program instructions and/or data are placed therein, generally only temporarily (i.e., for a short period of time until overwritten). The cache memory, which is typically located between the CPU and main memory in a computing system, is typically faster than main memory by a factor of 5 to 10 and typically approaches the speed of the CPU itself. By keeping the most frequently accessed instructions and/or data in the high speed cache memory, the average memory access time will approach the access time of the cache.

The active program instructions and data may be kept in a cache memory by utilizing the phenomenon known as "locality of reference". The locality of reference phenomenon recognizes that most computer program instruction processing proceeds in a sequential fashion with multiple loops, and with the CPU repeatedly referring to a set of instructions in a particular localized area of memory. Thus, loops and subroutines tend to localize the references to memory for fetching instructions. Similarly, memory references to data also tend to be localized, because table lookup routines or other iterative routines typically repeatedly refer to a small portion of memory.

In view of the phenomenon of locality of reference, a small, high speed cache memory may be provided for storing a block of data and/or instructions from main memory which are presently being processed. Although the cache is only a small fraction of the size of main memory, a large fraction of memory requests will locate data or instructions in the cache memory because of the locality of reference property of programs. In a CPU which has a relatively small, relatively high speed cache memory and a relatively large, relatively low speed main memory, the CPU examines the cache when a memory access instruction is processed. If the desired word (data or program instruction) is found in cache, it is read from the cache. If the word is not found in cache, the main memory is accessed to read that word, and a block of words containing that word is transferred from main memory to cache memory. Accordingly, future references to memory are likely to find the required words in the cache memory because of the locality of reference property.

The performance of cache memory is frequently measured in terms of a "hit ratio". When the CPU references memory and finds the word in cache, it produces a "hit". If the word is not found in cache, then it is in main memory and it counts as a "miss". The ratio of the number of hits divided by the total CPU references to memory (i.e. hits plus misses) is the hit ratio. Experimental data obtained by running representative programs has indicated that hit ratios of 0.9 (90%) or higher are needed to justify the search time to determine a hit or miss because the search time is added to the normal memory access time in the case of a miss. With such high hit ratios, the memory access time of the overall data processing system approaches the memory access time of the cache memory, and may improve the memory access time of main memory by a factor of 5 to 10 or more. Accordingly, the average memory access time of the computing system may be improved considerably by the use of a cache.

Cache "misses" are generally undesirable, and, as the number of misses increases, memory access time generally increases and system performance generally decreases. Therefore, decreasing the number of misses, or, in the alternative, increasing the number of hits per access attempts, generally results in a decrease in access time and improvement in system performance.

A number of alternatives have been used in an effort to improve the hit ratio with respect to cache memory, including allowing system control over the use of the cache memory. One alternative approach is to store only instructions in the cache or to store only data in the cache. Another alternative approach is to enlarge the size of cache memory so that additional program instructions, data or both program instructions and data may be stored in the cache memory at any given time.

Unfortunately, these prior art alternatives may still produce problems of their own. For example, the enlargement of cache memory size may require additional storage space which may ultimately negatively impact system performance with respect to other operations even though access time may be decreased.

SUMMARY OF THE INVENTION

It is, therefore, an object of the present invention to provide systems and methods which can decrease the time for accessing cache memory without requiring a negative impact on system performance with respect to other system operations.

It is another object of the present invention to provide systems and methods which can decrease access time to cache memory without requiring increase in the size of the cache memory.

These and other objects are provided according to the present invention by convertible cache memory systems that control the mode of the cache memory. Convertible cache memory systems according to the present invention have a predetermined hit ratio and provide cache memories having cache memory addresses with data elements temporarily stored at the cache memory addresses. In addition, a tag is associated with each cache memory address. The present invention provides a use mode selector and a use mode cache controller. The use mode selector designates a portion of the cache memory located at a particular cache memory address to be converted from temporary memory to fixed memory such that the instructions, data or both instructions and data stored at the memory location are fixed or locked at the cache memory address and are not overwritten (i.e., the cache memory located at the cache memory address becomes a physical static random access memory (SRAM) address in a fixed address system).

Use mode cache controllers, according to the invention, which use the cache memory address selectively designated by the use mode selector, the tag associated with the selectively designated cache memory address, and an input address from a memory address register being utilized by a memory access instruction, convert the portion of the cache memory located at the designated cache memory address from temporary memory to fixed memory. As a result of the conversion, the hit ratio of the cache memory can be increased without requiring increases in the cache memory size.

More particularly, the use mode cache controller, using upper limit address and lower limit address for the cache memory, a tag from the cache memory, and the input address from the memory address register, determines if the data element associated with the input address is actually present in the cache memory. Based upon a determination that the data element associated with the input address is presently in cache memory, the present invention, using the mode selector, designates the portion of cache memory located at the cache memory address corresponding to the input address for conversion from temporary memory to fixed memory. Thereafter, a processor causes the portion of cache memory located at this cache memory address to be converted from temporary memory to fixed memory so that the instruction or data stored at the cache memory address cannot be overwritten and remains fixed in the cache memory.

DESCRIPTION OF A PREFERRED EMBODIMENT

Figure 1:
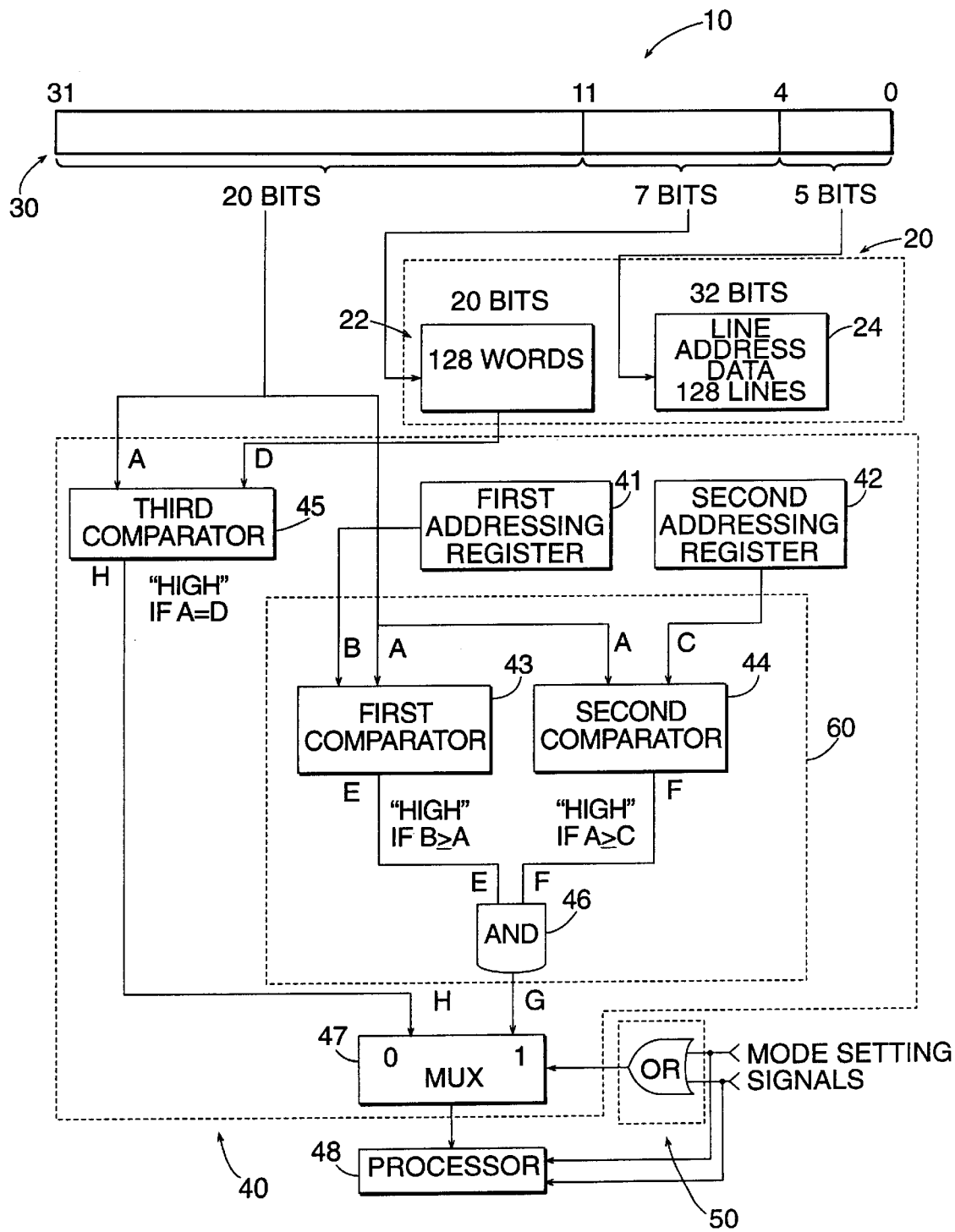
FIG. 1 is a block diagram of the use mode setting apparatus for a cache memory according to the present invention.

The present invention now will be described more fully hereinafter with reference to the accompanying drawing, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

Referring now to FIG. 1, a use mode convertible cache memory including a use mode setting apparatus will now be described. The convertible cache memory system includes cache memory 20 which is typically smaller than main memory, but is typically faster than main memory. The data and associated tags may be stored in either a single cache memory or in separate cache memories. In the particular embodiment shown in FIG. 1, the data and associated tags are stored in separate cache memories, namely, tag random access memory (RAM) 22 and data cache RAM 24. Each tag in tag RAM 22 uniquely corresponds to a particular line address in data cache RAM 24. Data, program instructions, or both data and program instructions can be stored in data cache RAM 24. The data and/or instructions stored in data cache RAM 24 shall hereinafter be referred to as "data." In this particular embodiment, tag RAM 22 contains 128 words, each word having 20 bits. Data cache RAM 24 has 128 line addresses and is capable of storing up to 32 bytes of data.

In the particular embodiment shown in FIG. 1, the address for the demanded word stored in main memory is maintained by a central processing unit (not shown) in main memory address register 30. Main memory address register 30 has a length of 32 bits, with the lowest 5 bits (i.e., bits 0–4) used to reference the line addresses in data cache RAM 24, the next 7 bits (i.e., bits 5–11) used to reference the tags in tag RAM 22, and the highest 20 bits (i.e., bits 12–31) containing the input address to be utilized by use mode cache controller 40.

In the present invention as illustrated in FIG. 1, use mode cache controller 40 uses the input address (bits 12–31 of memory address register 30), a tag from tag RAM 22 and the upper limit address and lower limit address for the data presently, but temporarily, stored in data cache RAM 24, to determine whether the data corresponding to the input address is presently in the data cache RAM 24.

Use mode cache controller 40 also receives a mode selection signal from use mode selector 50. Depending on the signal received from the use mode selector 50, use mode cache controller 40 will cause the portion of data cache RAM 24 located at the line address (i.e., cache memory address) corresponding to the input address (i.e., bits 12–31 of memory address register 30) to be converted from temporary memory to fixed memory. In the particular embodiment described, fixed memory is a physical static random access memory (SRAM) such that the data stored at the designated line address in data cache RAM 24 is converted into a physical SRAM of a fixed address system. However, it will be understood by those skilled in the art that other forms of fixed memory may be used by the present invention.

Still referring to FIG. 1, use mode cache controller 40 will now be further described. Use mode cache controller 40 has a first addressing register 41 and a second addressing register 42. The first addressing register 41 has an upper limit address corresponding to the highest main memory address associated with the data presently stored in data cache RAM 24. The second addressing register 42 has a lower limit address stored therein which relates to the lowest main memory address corresponding to data presently stored in data cache RAM 24.

Use mode cache controller 40 also has a first comparator 43, a second comparator 44, a third comparator 45 and an AND gate 46. The combination of first comparator 43, second comparator 44 and the AND gate 46 can form cache address boundary means 60. Cache address boundary means 60, using the upper limit address from first addressing register 41, the lower limit address from second addressing register 42 and the input address (i.e., bits 12–31 of memory address register 30) determines whether or not the input address is between the upper limit address and the lower limit address of data cache RAM 24. In particular, first comparator 43 compares input address (identified by the letter "A") with the upper limit address from first addressing register 41 (identified by the letter "B"). If first comparator 43 determines that the upper limit address (B) is greater than or equal to the input address (A) (i.e., B≧A), the output of first comparator 43 (identified by the letter "E") is "high" (i.e., "1"). Otherwise, if first comparator 43 determines that the upper limit address (B) is less than the input address (A), the output (E) of first comparator 43 is "low" (i.e., "0").

Second comparator 44 compares the input address (A) with the lower limit address from second addressing register 42 (identified by the letter "C"). If the second comparator 44 determines that the input address (A) is greater than or equal to the lower limit address (C) (i.e., A≧C), then the output of second comparator 44 (identified by the letter "F") is "high" (i.e., "1"). Otherwise, if the second comparator 44 determines that the input address (A) is less than the lower limit address (C), the output (F) of second comparator 44 will be "low" (i.e., "0")

Finally, the outputs of first comparator 43 and second comparator 44 (i.e., E and F, respectively) are logically multiplied using AND gate 46. If the outputs of the first comparator 43 and the second comparator 44 (i.e., E and F, respectively) are both "high" (i.e., "1"), then the output of the AND gate 46 (identified by the letter "G") will also be "high" (i.e., "1") indicating that input address (A) is between upper limit address (B) and lower limit address (C). Otherwise, if the output of either first comparator 43 or second comparator 44 (i.e., E or F, respectively) is "0," the output (G) of AND gate 46 will also be "0" indicating that the input address (A) was either greater than the upper limit address (B) or less than the lower limit address (C).

Use mode cache controller 40 also has a third comparator 45 which compares input address (A) with a tag from tag RAM 22 (identified by the letter "D") which was accessed using bits 5–11 from memory address register 30. If the third comparator 45 determines that input address (A) is equal to the tag (D), then the output of third comparator 45 (identified by the letter "H") will be "high" (i.e., "1"). Otherwise, if input address (A) and tag (B) are not equal, the output (H) of third comparator 45 will be "low" (i.e., "0").

Finally, use mode cache controller 40 has a multiplexor 47 which provides control signal to a processor 48. Multiplexor 47 has three inputs, namely, the output (H) from third comparator 45, the output (G) of AND gate 46 (indicating whether or not input address (A) is between the upper limit address (B) and the lower limit address (C)), and the output of use mode selector 50. Multiplexor 47 selects the output based on the mode setting signals of use mode selector 50. The output of multiplexor 47 is provided to processor 48 for controlling the conversion of the portion of data cache RAM 24 located at the cache memory address from temporary memory to fixed memory. The processor 48 may set the size of this portion of data cache RAM 24 to either 2K bytes or 4K bytes according to the mode setting data provided by the use mode selector 50 which is an OR gate as shown in the embodiment illustrated in FIG. 1.

Therefore, as a result of the present invention, a portion of data cache RAM 24 can be converted into a physical SRAM of a fixed address system permitting the data which is located at the particular cache memory address to remain in cache memory 24 permanently. This conversion can decrease access time while improving system performance, without requiring an increase in the size of data cache RAM 24.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A convertible cache memory system comprising:

a memory address register having at least an input address stored therein;

cache memory means having a predetermined plurality of cache memory addresses for temporarily storing data elements at each of said cache memory addresses, and for associating a tag with each cache memory address;

use mode selection means for selectively designating at least one of said cache memory addresses for conversion to a fixed address; and use mode cache controlling means, responsive to at least one of the tags associated with a cache memory address, to said use mode selection means and to said memory address register, for converting the designated cache memory address from a temporary address to a fixed address, such that the data element in the cache memory means has associated with it a fixed memory address.

2. A convertible cache memory system according to claim 1 wherein the designated at least one of said cache memory addresses corresponds to said input address.

3. A convertible cache memory system according to claim 1 wherein said use mode cache controlling means comprises:

first addressing register having an upper limit address stored therein;

second addressing register having a lower limit address stored therein;

cache address boundary means, responsive to said first addressing register, said second addressing register and said input address, for determining that said input address is between said upper limit address and said lower limit address; and controlling means, responsive to at least said cache address boundary means and said use mode selection means, for converting the designated at least one cache memory address from a temporary address to a fixed address.

4. A convertible cache memory system according to claim 3 wherein said controlling means comprises:

multiplexing means, responsive to at least said cache address boundary means and said use mode selection means, for selecting the determination of said cache boundary means.

5. A convertible cache memory system according to claim 3 wherein said cache address boundary means comprises:

first comparing means, responsive to said first address register and said input address, for determining that said input address is no greater than the upper limit address stored in said first address register;

second comparing means, responsive to said second address register and said input address, for determining that said input address is no less than the lower limit address stored in said second address register; and logical multiplying means, responsive to said first comparing means and said second comparing means, for logically multiplying the determinations of said first comparing means and said comparing means.

6. A convertible cache memory system according to claim 1 wherein said use mode selection means comprises:

accepting means for accepting a plurality of bits representing a selective designation of at least one of said cache memory addresses for conversion to a fixed address; and logical addition means, responsive to said accepting means, for logically adding the plurality of bits to uniquely identify the selectively designated at least one of said cache memory addresses.

7. A use mode setting apparatus for a cache memory comprising;

first addressing means for setting an upper limit address of a fixed address portion of the cache memory;

second addressing means for setting a lower limit address of the fixed address portion of the cache memory;

cache memory controlling means, responsive to said first addressing means, to said second address means and to an input address, for determining that said input address is between said upper limit address and said lower limit address, and for generating a data item corresponding to said input address;

mode setting means for generating mode setting data indicating that said cache memory is to incorporate a fixed address portion; and multiplexing means, responsive to said cache memory means and said mode setting means, for selecting the data item generated by said cache memory controlling means based on said mode setting data, and for transferring the selected data to a processor.

8. A use mode setting apparatus for a cache memory according to claim 7 wherein said cache memory controlling means comprises:

first comparing means, responsive to said first addressing means and said input address, for comparing said upper limit address with said input address to obtain first comparing output data;

second comparing means, responsive to said second addressing means and said input address, for comparing said lower limit address with said input address to obtain second comparing output data; and an AND gating means, responsive to said first comparing means and to said second comparing means, for logically multiplying said first comparing output data and said second comparing output data.

9. A use mode setting apparatus for a cache memory according to claim 7 wherein said mode setting means comprises an OR gating means for accepting input mode setting data to obtain mode setting data used to convert a portion of the cache memory to operate as fixed address memory.

10. A method for operating a cache memory system, said cache memory system including a memory address register having at least an input address stored therein, and a cache memory having a predetermined plurality of cache memory addresses for temporarily storing data elements at each of said cache memory addresses and a tag associated with each cache memory address, said method comprising the steps of:

selectively designating at least one of said cache memory addresses for association with a fixed address; and associating the selectively designated cache memory address having a temporary address with a fixed address in response to the selectively designated cache memory address and said input address, such that the data element stored in the cache memory means has associated with it a fixed address.

11. A method according to claim 10 wherein said selectively designating step comprises the step of selectively designating one of said cache memory addresses which corresponds to said input address.

12. A method according to claim 10 wherein said associating step comprises the steps of:

obtaining an upper limit address corresponding to a portion of cache memory to be utilized as static random access memory;

obtaining a lower limit address corresponding to the portion of cache memory to be utilized as static random access memory;

determining whether the input address is between said upper limit address and said lower limit address;

generating a boundary output in response to said determining step which indicates whether the input address is between the under limit and the lower limit; and associating the selectively designated at least one cache memory address with a fixed address based on the boundary output.

13. A method according to claim 12 wherein said determining step comprises the steps of:

comparing the upper limit address and the input address to determine whether the input address is no greater than the upper limit address;

comparing the lower limit address and said input address to determine whether the input address is no less than the lower limit address; and logical multiplying the results of the upper limit address comparing step and the lower limit address comparing step.

14. A method according to claim 10 wherein said selectively designating step comprises the steps of:

accepting a plurality of bits representing a selective designation of at least one of said cache memory addresses for association with a fixed address; and logically adding the plurality of bits to uniquely identify the selectively designated at least one of said cache memory addresses.

* * * * *

UNITED STATES PATENT AND TRADEMARK OFFICE
CERTIFICATE OF CORRECTION

PATENT NO. : 6,092,151
DATED : July 18, 2000
INVENTOR(S) : Heon-Chul Park

It is certified that error appears in the above-identified patent and that said Letters Patent is hereby corrected as shown below:

Title page, item [54],
Title,
Please delete "CRT UPDATE".

Signed and Sealed this

Twenty-third Day of October, 2001

Attest:

*Nicholas P. Godici*

NICHOLAS P. GODICI
*Attesting Officer*     *Acting Director of the United States Patent and Trademark Office*